Nov. 6, 1951 P. H. HARTLEY 2,574,328
COLOR HARMONIZING CARD GAME
Filed June 30, 1949
INVENTOR
PAUL H. HARTLEY
BY
ATTORNEYS Patented Nov. 6, 1951

2,574,328

UNITED STATES PATENT OFFICE 2,574,328

COLOR HARMONIZING CARD GAME

Paul H. Hartley, Westport, Conn.

Application June 30, 1949, Serial No. 102,335

3 Claims. (Cl. 273—152)

The present invention relates to games, and has special reference to games for teaching color harmony.

The principal object of the invention is to provide a game of this character which is particularly adapted for the development of a keen sense of color harmony in the player, and which is extremely interesting and pleasing to play.

The invention is illustrated, by way of example, in the accompanying drawings in which:

Figures 1, 2, 3 and 4 are face or front views of groups of cards for use in playing the game, with the cards of each group arranged side by side; and Figs. 5, 6, 7 and 8 are back views of one of the cards of each group.

As illustrated in the drawings, the pack or deck may consist of fifty-two cards divided into four groups with thirteen cards in each group.

The front sides of the cards are colored and the cards of each group may bear the numbers 1 to 13 inclusive, as shown. The colors of each group consist of the six rainbow or spectrum colors and gray and between each two of those colors is an intermediate color.

In the drawings the colors are indicated as follows: red by the letter r; orange by o; yellow by y; green by g; blue by b; violet by v; gray by bw.

The four cards No. 1 of the four groups are red r. The four No. 2 cards are red-orange r-o. The four No. 3 cards are orange o. The four No. 4 cards are yellow-orange y-o. The four No. 5 are yellow y. The four No. 6 are yellow-green y-g. The four No. 7 are green g. The four No. 8 are blue-green b-g. The four No. 9 are blue b. The four No. 10 are blue-violet b-v. The four No. 11 are violet v. The four No. 12 are red-violet r-v. The four No. 13 are gray bw, being a mixture of black and white with another color added in the case of three of the four members.

The back of each card carries a distinguishing symbol such as the letters "A," "B," "C" and "D," each symbol being for all thirteen cards of each group.

All of the thirteen cards of each group are color harmonious one to the other. But the color of each of the cards of each group is discordant or unharmonious with the colors of the cards of the three other groups, and the colors of the cards of each group vary enough from those of the other groups to be distinguishable by the normal human eye.

Such variations in the colors of the several groups are due to the fact that to the so-called primary colors, red, blue, and yellow, a different color cast has been given each group, for example the "A" group has a yellow cast to it; the "B" group has a white cast; the "C" group has a blue cast; while the colors of the "D" group have a yellow and gray cast. The color of everyone of the fifty-two cards is either one of those primary colors, or else the blending of those colors plus certain admixtures of white and black.

The game may be played in various ways between opponents but for simplicity of description it will be described as played as a game of solitaire.

In playing the game the cards are shuffled and placed face or color side up on the card table. The player first selects any No. 1 card and starts building a column of thirteen cards with the No. 1 at the top. Under the No. 1 he places the No. 2 which his color perception dictates most harmoniously belongs next to No. 1. He then does the same with a No. 3 card, and so on until he has arranged a column of thirteen cards in the order of their numbers, and their color harmony as he sees them. He then selects any of the other three No. 1 cards and similarly arranges the thirteen cards of that column or group. In a like manner he arranges the third and fourth columns or groups, until all fifty-two cards are thus arranged. Finally he surveys the entire four groups as he has arranged them in columns, and makes any changes that he feels are necessary until he is satisfied with the result.

When he has done this the player is ready to tally his score. This is done by turning over a No. 1 card and noting the symbol on the back thereof. If it carries the symbol "A" for instance, all cards in that column when turned over must carry the same symbol to get a perfect score of 13 for that column. All that do not carry the symbol "A" in that column count a score against the player. He tallies all four columns this way. A perfect score thus would be fifty-two.

Only by practice and care could one expect to arrive at a perfect score. Thus the playing of the game not only affords amusement and entertainment as a game purely and simply, but it also trains the player to have good color taste and a true sense of color harmony.

It has been observed that the normal human eye has an affinity for one of the four color groups "A," "B," "C" and "D" above described. Every artist or other individual seems to instinctively prefer one of these groups. Whether the group of their choice is right or wrong in the choice of clothing and dress accessories is to be determined by their peculiar color and body pigmentation. However, this individual peculiarity is not important in the choice of less personal decoration, such as a color group for home enhancement. An individual who would be ill-advised to use the group of their choice in clothes, could use their chosen group in home decoration.

When a player of the game has reached a state of color harmonizing perfection so that he feels competent to choose utilitarian colors within any group, or group that he elects, the portion of the deck of cards thus involved can be separated from the deck and carried along on excursions of purchase and selection of colored merchandise. By doing this the opportunity and chance of selecting discordant colors is reduced to a minimum. It will be apparent that the color harmonizing skill acquired in playing the game, may be useful to the player in many other instances.

While it is preferred to employ fifty-two cards, divided into the four groups as I have found this to be most practicable and convenient to the average adult with normal eyesight, and also to make workable subsidiary training in color harmonizing and use in harmonizing colored merchandise, it will be apparent that the number of cards and groups of cards may be varied. Also the cards may be of the usual playing card form as shown or in the form of plastic slabs or blocks.

What I claim is:

1. A game of the class described comprising a plurality of groups of cards with the front sides of the cards bearing different colors, the colors of the cards of each group being in harmony and respectively comprising the primary and intermediate colors of the spectrum, the colors of the cards of the several groups being of different color casts, the back of each card bearing a symbol designating the group to which the card belongs, and the front side of each card bearing a symbol designating its proper spectrum location in its group.

2. A game of the class described comprising a plurality of groups of cards with the front sides of the cards bearing different colors, the colors of the cards of each group being in harmony and respectively comprising the primary and intermediate colors of the spectrum, the colors of the cards of the several groups being of different color casts, and the back of each card bearing a symbol designating the group to which the card belongs.

3. A pack of cards made up of a plurality of groups with the front sides of the cards bearing different colors and each group consisting of thirteen cards, the colors of the cards of each group being in harmony and respectively comprising the six colors of the spectrum and six intermediate colors and the color gray, the colors of the cards of the several groups being of different color casts, each card bearing on the front thereof a symbol designating its proper spectrum location in its group, and the back of each card bearing a symbol designating the group to which the card belongs.

PAUL H. HARTLEY.

REFERENCES CITED

The following references are of record in the file of this patent:

UNITED STATES PATENTS

| Number | Name | Date |
|---|---|---|
| 1,410,922 | Johnson | Mar. 28, 1922 |
| 1,738,902 | Howard | Dec. 10, 1929 |
| 2,162,428 | Goldman | June 13, 1939 |